(12) United States Patent
Ida et al.

(10) Patent No.: US 7,929,164 B2
(45) Date of Patent: Apr. 19, 2011

(54) IMAGE FORMING APPARATUS ACCEPTING A PRINT JOB AND COMPUTER TRANSMITTING A PRINT JOB

(75) Inventors: Toshihiro Ida, Tokyo (JP); Kazuhiro Ogura, Fujisawa (JP); Shinji Makishima, Tokyo (JP); Akihiro Mizutani, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1232 days.

(21) Appl. No.: 11/229,579

(22) Filed: Sep. 20, 2005

(65) Prior Publication Data

US 2007/0070393 A1 Mar. 29, 2007

(51) Int. Cl.
*G06F 3/012* (2006.01)
*G06K 15/00* (2006.01)
*G06F 9/046* (2006.01)

(52) U.S. Cl. ............... 358/1.15; 358/1.16; 358/1.18; 358/1.13; 358/1.1; 718/100; 718/101; 718/102; 718/103; 340/5.2

(58) Field of Classification Search ........ 358/1.14–1.18, 358/400–407; 340/5.2, 5.5, 5.51–5.54, 5.8, 340/5.81–5.86; 715/273, 274; 700/237; 705/18, 57, 58; 711/164; 713/176, 182–185, 713/500–502; 382/303–306; 707/1, 7; 726/26–33
See application file for complete search history.

(56) References Cited

U.S. PATENT DOCUMENTS

| | | | |
|---|---|---|---|
| 5,970,218 A * | 10/1999 | Mullin et al. | 358/1.15 |
| 6,545,767 B1 * | 4/2003 | Kuroyanagi | 358/1.14 |
| 6,771,386 B1 * | 8/2004 | Kato | 358/1.15 |
| 6,785,727 B1 * | 8/2004 | Yamazaki | 709/229 |
| 6,791,703 B1 * | 9/2004 | Maeda et al. | 358/1.15 |
| 6,981,254 B2 * | 12/2005 | Parry | 718/100 |
| 2001/0012122 A1 * | 8/2001 | Ueda | 358/1.15 |
| 2005/0105121 A1 * | 5/2005 | Hirano | 358/1.14 |
| 2005/0190396 A1 * | 9/2005 | Ozawa | 358/1.14 |

FOREIGN PATENT DOCUMENTS

JP 2003-025692 A 1/2003

* cited by examiner

*Primary Examiner* — Twyler L Haskins
*Assistant Examiner* — Chad Dickerson
(74) *Attorney, Agent, or Firm* — Foley & Lardner LLP

(57) ABSTRACT

An image forming apparatus judges whether an identical part is included in the key and the printing contents, based on the result of comparing a previously stored key with the printing contents of a received print job. When the apparatus judges that an identical part is included, the apparatus stores the received print job in a private print job queue for private printing. When the apparatus judges that an identical part is not included, the apparatus stores the received print job in an ordinary print job queue for ordinary printing.

18 Claims, 9 Drawing Sheets

| Job ID | Date and time | User ID | Private print | Data body |
|---|---|---|---|---|
| J00021 | 2005/02/26 08:00 | Taro | NO | XXX.ps |
| J00022 | 2005/02/26 11:00 | Hanako | YES | xyx.ps |
| J00023 | 2005/02/26 16:50 | Jiro | YES | zxy.ps |

F I G. 3

| User ID | Group ID | Mail address |
|---|---|---|
| Taro | Group A | Taro@***** |
| Hanako | Group B | Hanako@***** |
| Jiro | Group A | Jiro@***** |

F I G. 4

| Key setting memory |
|---|
| Secret |
| X copy X |
| Image A |
| ⋮ |

F I G. 5

US 7,929,164 B2

IMAGE FORMING APPARATUS ACCEPTING A PRINT JOB AND COMPUTER TRANSMITTING A PRINT JOB

BACKGROUND OF THE INVENTION

1. Field of the Invention

The present invention relates to an image forming apparatus to receive a confidential document print job, and a computer to send the print job.

2. Description of the Related Art

There is a known printer system provided with a confidential print function to start printing confidential print data on a paper sheet by inputting a request to output confidential print data from an input unit attached to a printer, when a confidential print request is sent from a client system to a printer. This printer system eliminates the confidential print data remaining in a printer server, after the output request enabling time passes in a print job management unit (Jpn. Pat. Appln. KOKAI Publication No. 2003-25692).

In the prior art, when a confidential document is printed, private print and ordinary print are separated by the user's judgment. Private print is a technique to perform printing output of print data by inputting an output request from an input unit attached to a printer, when a print request is sent from a client system to a printer.

In the above prior art, if the user prints a confidential document as an ordinary print by mistake, the confidential document may be seen or stolen by a third party.

Therefore, there is a need for an image forming apparatus and a computer, which prevent a confidential document from being seen or stolen by a third party even if a user prints it ordinarily by mistake.

BRIEF SUMMARY OF THE INVENTION

According to an aspect of the present invention, there is provided an image forming apparatus comprising a receiving unit configured to receive a print job through a network; a key setting memory configured to store a key for a private print; a comparator configured to compare the printing contents of the print job received by the receiving unit with the key stored in the key setting memory; a key judgment unit configured to judge whether an identical part is included in the key and the printing contents; a first job processing unit configured to store the received print job in a private print job queue for private printing when the key judgment part judges that the identical part is included; and a second job processing unit configured to store the received print job in an ordinary print job queue for ordinary printing when the key judgment part judges that the identical part is not included.

According to another aspect of the present invention, there is provided a method of sending a print job to an image forming apparatus of a computer comprising displaying a print screen for creating a sending print job to an image forming apparatus; comparing the printing contents of the sending print job with a previously stored key for private printing; judging whether an identical part is included in the key and the printing contents based on the result of the comparison; and adding an identifier to the sending print job, to make the image forming apparatus store the print job in a private print job queue for private printing when the identical part is judged included.

Objects and advantages of the invention will become apparent from the description which follows, or may be learned by practice of the invention.

BRIEF DESCRIPTION OF THE SEVERAL VIEWS OF THE DRAWING

The accompanying drawings illustrate embodiments of the invention, and together with the general description given above and the detailed description given below, serve to explain the principles of the invention.

FIG. 3 is a print job database in the same embodiment;

FIG. 4 is a user information database in the same embodiment;

FIG. 5 shows a key setting memory in the same embodiment;

DETAILED DESCRIPTION OF THE INVENTION

Embodiments of the present invention will be explained hereinafter with reference to the accompanying drawings.

First Embodiment

Figure 1:
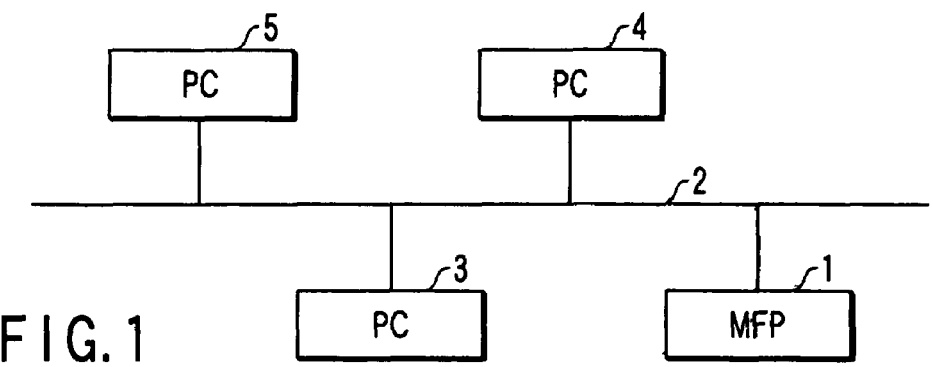
FIG. 1 is a schematic block diagram of a network configuration in a first embodiment of the present invention.

FIG. 1 is a schematic block diagram of a network configuration in a first embodiment. As shown in FIG. 1, a multifunction peripheral (hereinafter called an MFP) 1 is connected to personal computers (PC) 3, 4 and 5 through a network 2. The PC 3 is a computer of a manager to manage the components connected to the network 2.

Figure 2:
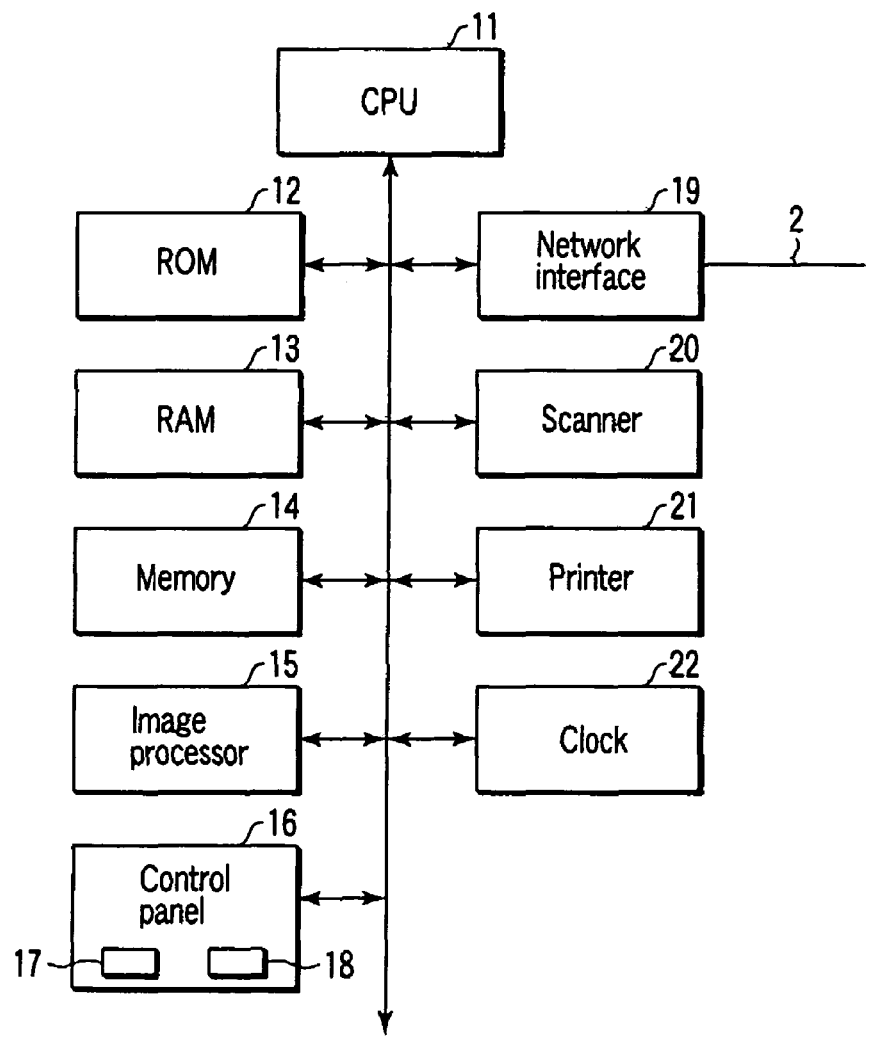
FIG. 2 is a block diagram of essential components of MFP in the same embodiment.

FIG. 2 is a block diagram of essential components of the MFP 1. As shown in FIG. 2, the MFP 1 comprises a CPU 11, a ROM 12, a RAM 13, a memory 14, an image processor 15, a control panel 16, a network interface 19, a scanner 20, a printer 21, and a clock 22. The CPU 11 is connected to the ROM 12, RAM 13, memory 14, image processor 15, control panel 16, network interface 19, scanner 20, printer 21 and clock 22, through a bus line.

The CPU 11 controls the whole MFP 1 by executing a control program stored in the ROM 12. The ROM 12 stores a control program and fixed data to be executed by the CPU 11.

The RAM 13 has a work area required by the CPU 11 to execute the control program stored in the ROM 12.

The memory 14 is a hard disc drive, for example. The memory 14 stores various programs and various data, such as, image data, print job database D1 described later, user information database D2 and key setting memory 14a. The image processor 15 compresses and decompresses image data. The control panel 16 has a control unit 17 and a display unit 18. The control unit 17 sends the CPU 11 an instruction received from a user. The display unit 18 displays the information necessary for a user under the control of CPU 11. The network interface 19 connects the network 2, and makes data communication with the PCs 3, 4 and 5 connected to the network 2. The scanner 20 reads an image from an original set on a not-shown original table or an original sent from a not-shown automatic paper supply unit, and creates image data. The printer 21 forms an image on a recording paper sheet based on a print job received through the network 2 or the image data read from the memory 14 and decompressed by the image processor 15. The clock 22 creates date and time information. The date and time information created by the clock 22 is supplied to the CPU 11 at need.

Next, explanation will be given on the print job database D1, user information database D2 and key setting memory 14a stored in the memory 14, with reference to FIG. 3 to FIG. 5.

FIG. 3 is a print job database D1. The print job database D1 stores the information about a print job as data when receiving a print job. A receiving print job may be either an ordinary print job or a confidential document print job. A confidential document includes the key stored in the key setting memory 14a. As shown in FIG. 3, the print job database D1 manages the following items concerning each print job. Namely, the print job database D1 manages "job ID", "date and time", "user ID", "private print" and "data body". The "job ID" stores an ID added for discrimination with the MFP 1. The "date and time" stores the date and time to receive a print job from any one of PCs 3, 4 and 5 through the network 2. The "user ID" stores the user ID of a user who lists a print job in the print job database D1. The "private print" stores the information to determine private print or not. For example, "YES" is stored for a private print, and "NO" is stored for not a private print. The "data body" stores the data indicating the printing contents.

FIG. 4 is a user information database D2. The user information database D2 manages the following items concerning each user. Namely, the user information database D2 manages "user ID", "group ID" and "mail address". The "user ID" stores the user who sends a print job. The "group ID" stores the group ID of a group to which the user belongs. The "mail address" stores the mail address of the user. The user information database D2 stores the passwords of each user (not shown), in addition to the above items.

FIG. 5 shows a key setting memory 14a. A key stored in the key setting memory 14a is used to determine whether a received print job is a private print or an ordinary print. The key is a specific character string, a sign or an image used for a confidential document. Concretely, as shown in FIG. 5, "Secret", "X copy X" and "Image A" are set as a key. Each key is given a not-shown flag. For example, a key with a flag "1" is selected as a key for the matching operation described later, and a key with a flag "0" is not selected as a key for the matching. The flag "1" and flag "0" are changed on a key select screen 183 described later.

Next, explanation will be given on the operations when setting a key in the key setting memory 14a. FIG. 6 to FIG. 9 shows the setting screens displayed on the display unit 18 when setting a key.

Figure 6:
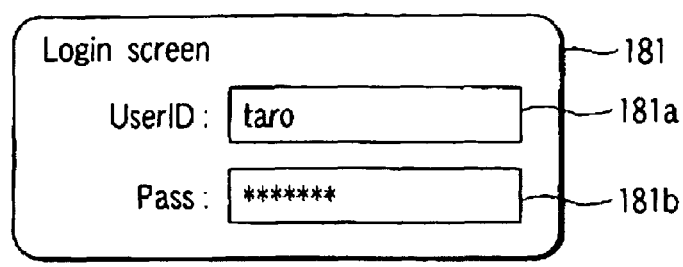
FIG. 6 shows an example of a login screen in the same embodiment.

FIG. 6 shows an example of a login screen 181 to log in the key setting memory 14a. The login screen has an area 181a to enter a user ID, and an area 181b to enter a password. A user enters a user ID and a password by using the control unit 17. The MFP 1 refers to the user information database D2, and verifies that the user is a registered user based on the entered user ID and password. After verification, a change item select screen 182 appears on the display unit 18. In the first embodiment, login is to be made by using the control panel 16 of MFP 1. However, login is also possible from the PC 3 of a manager through the network 2.

Figure 7:
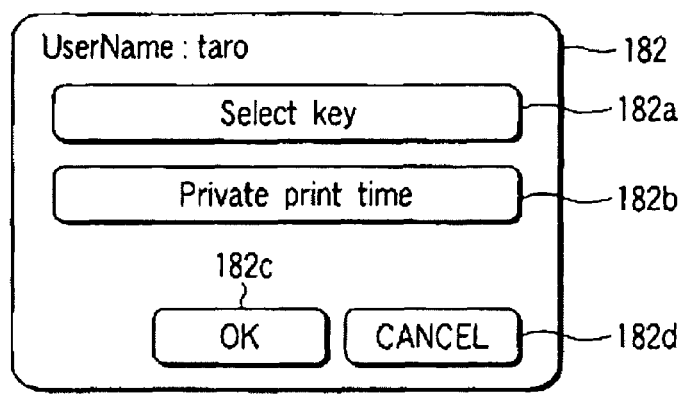
FIG. 7 shows an example of a change item select screen in the same embodiment.

FIG. 7 shows an example of the change item select screen 182. The change item select screen 182 has a button 182a to specify a key, a button 182b to specify private print time, an OK button 182c and a CANCEL button 182d. The button 182b is used to change the setting of the time for private printing. The private time will be explained in detail later in a third embodiment. When the button 182a is pressed by a user, the key select screen 183 appears on the display unit 18.

Figure 8:
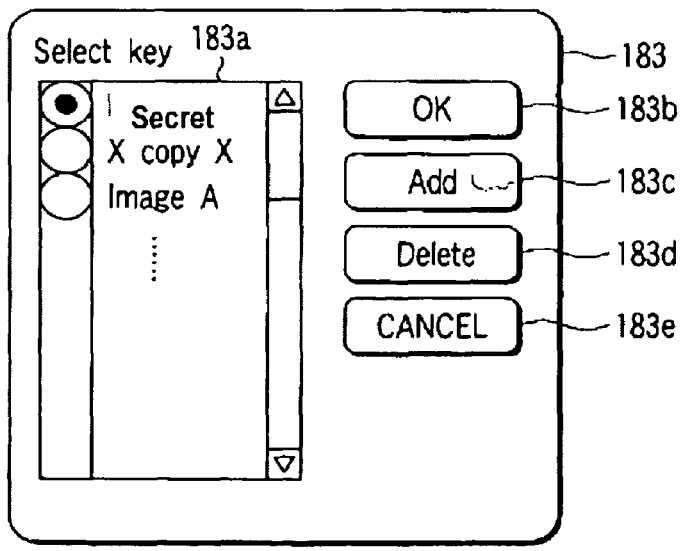
FIG. 8 shows an example of a key select screen in the same embodiment.

FIG. 8 shows an example of the key select screen 183. The key select screen 183 has a key select area 183a to select a key, an OK button 183b, an add button 183c, a delete button 183d and a CANCEL button 183e. The key select area 183a displays the keys stored in the key setting memory 14a. As shown in FIG. 8, the key select area 183a displays the "Secret", "X copy X" and "Image A" keys. The key select area 183a displays also a checkmark for each key to indicate whether the key is selected or not for the matching operation described later. In FIG. 8, "Secret" is checked, and "X copy X" and "Image A" are not checked. The checked key has a flag "1", and the unchecked keys have a flag "0". When the add button 183c is pressed by the user, a key add screen 184 to add a key is displayed. When the delete button 183d is pressed by the user, a key selected by a not-shown cursor is deleted. Namely, a corresponding key is deleted also from the key setting memory 14a.

Figure 9:
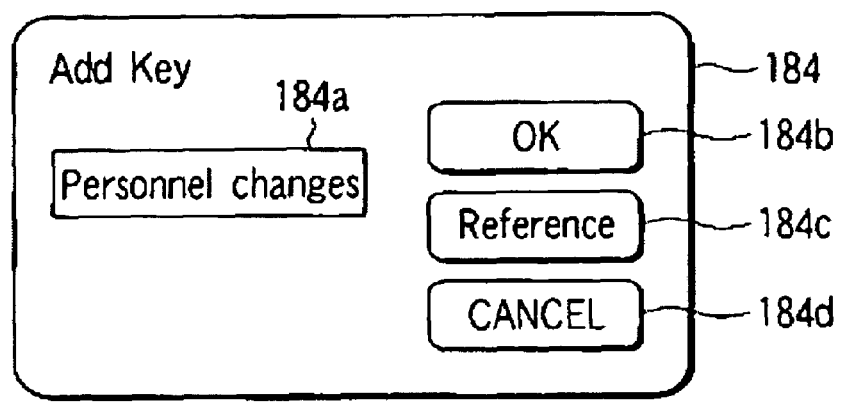
FIG. 9 shows an example of a key add screen in the same embodiment.

FIG. 9 shows an example of the key add screen 184. The key add screen 184 has an area 184a to display an added key, an OK button 184b, a reference button 184c and a CANCEL button 184d. As shown in FIG. 9, the user enters the key "Personnel changes" by using the control unit 17. Then, the user presses the OK button 184d. The key "Personnel changes" is stored in the key setting memory 14a.

Figure 10:
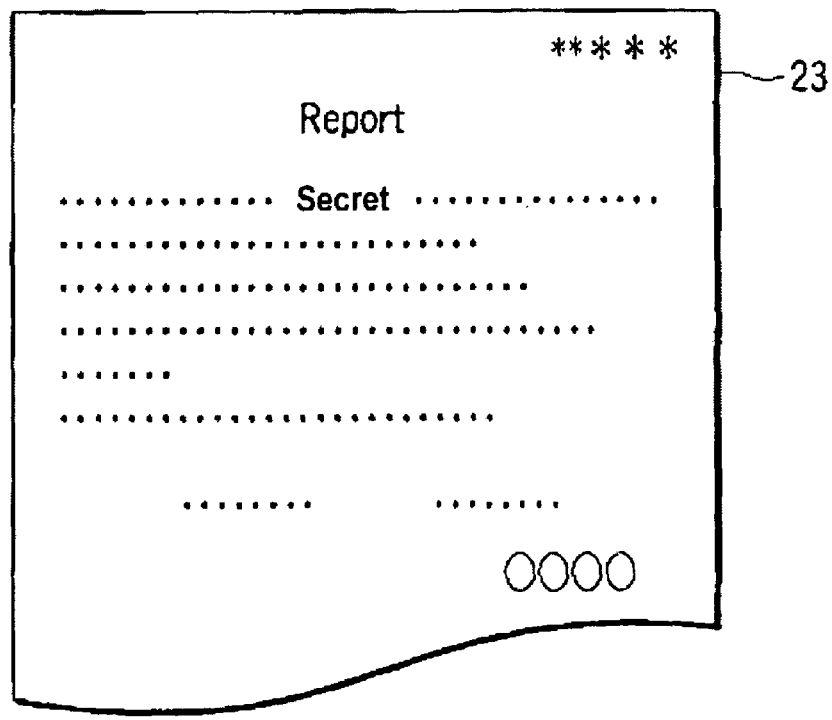
FIG. 10 shows an example of a document including a "Secret" key in the same embodiment.

FIG. 10 shows an example of a document 23 including the key "Secret".

Figure 11:
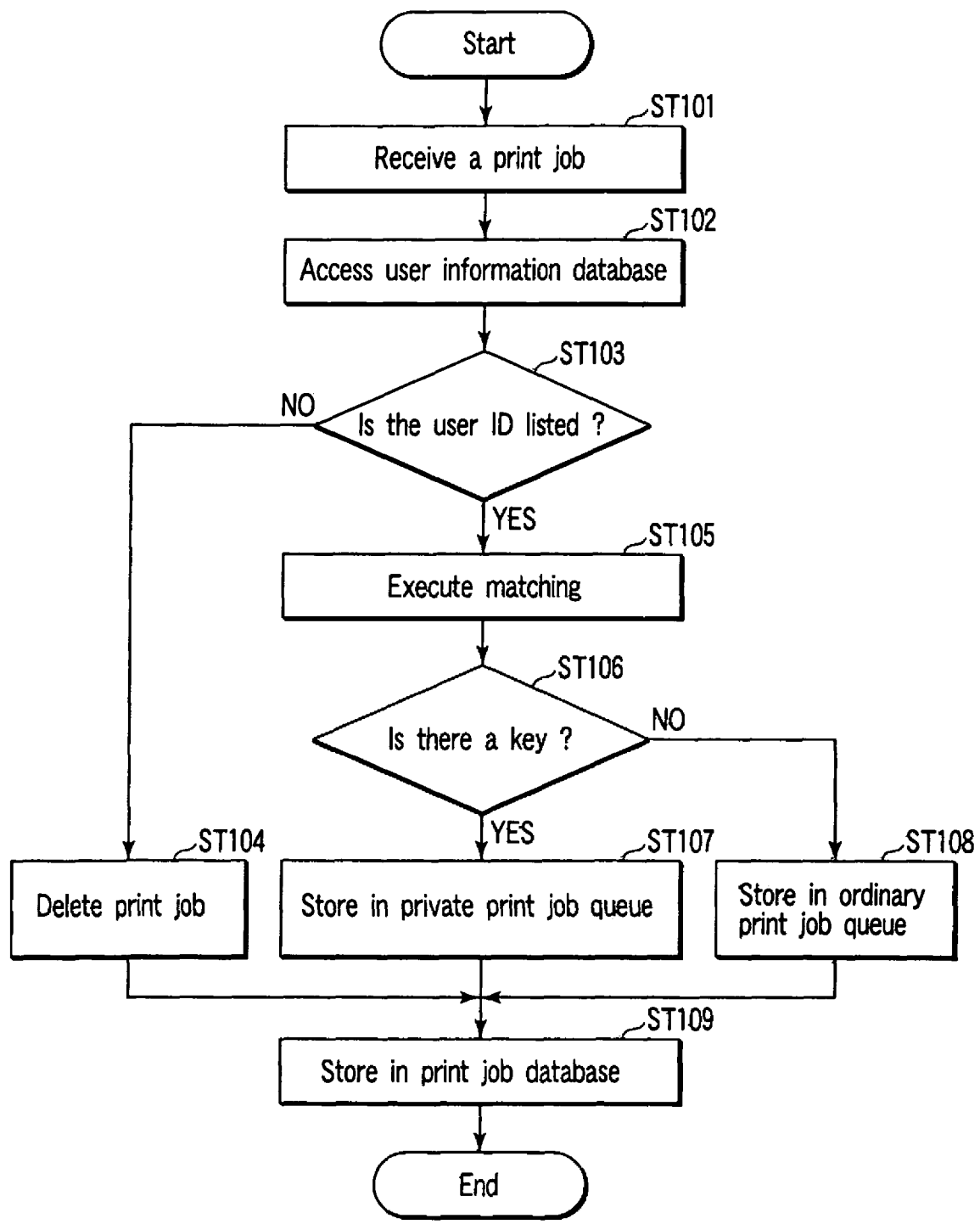
FIG. 11 is a flowchart of the processing executed by CPU in the same embodiment, when a print job is received.

Explanation will now be given on the processing executed when the MFP 1 receives a print job from any one of PCs 3, 4 and 5 through the network 2. FIG. 11 shows a flowchart of the processing executed by the CPU 11 when a print job is received.

Receiving a print job (ST 101), the CPU 11 accesses the user information database D2 (ST 102). The CPU 11 checks whether the user ID of the user sending the print job is listed in the user information database D2 (ST 103). When the CPU 11 judges that the user ID of the user sending the print job is not listed in the user information database D2 (NO in ST 103), the CPU 11 deletes that print job (ST 104). This is because a print job instructed by a user not listed in the database should not be executed.

When the CPU 11 judges that the user ID of the user sending the print job is listed in the user information database D2 (YES in ST 103), the CPU 11 executes matching (ST 105). By this matching, the data indicating the key selected on the key select screen 183 among the keys stored in the key setting memory 14*a* is compared with the data extracting the text data for example from the printed contents of the print job. If an image is selected as a key, the data indicating that image is compared with the image data indicating the printed contents.

After the matching, the CPU 11 checks whether the key is included in the print job (ST 106). Namely, the CPU 11 judges whether a part identical to the data indicating the key is included in the data indicating the printing contents, based on the result of comparing the data indicating the key with the data indicating the printing contents.

When the CPU 11 judges that the key is included (YES in ST 106), the CPU 11 stores the print job in a private print job queue for executing a private print job (ST 107). When the CPU 11 judges that the key is not included (NO in ST 106), the CPU 11 stores the print job in an ordinary print job queue for executing an ordinary print job (ST 108). After storing the print job in the private print job queue or ordinary print job queue, the CPU 11 stores the print job in the print job database D1 (ST 109). In this time, when the print job is stored in the private print job queue, "YES" is stored in the "Private print" area of the print job database D1, and when the print job is stored in the ordinary print job queue, "NO" is stored.

Next, explanation will be given on the operations executed when the MFP 1 configured as above receives a print job to print the document 23 shown in FIG. 10 from the PC 3 through the network 2. The user ID of the PC 3 is "Taro", and listed in the user information database D2.

Receiving the print job from the PC 3, the MFP 1 checks whether the user ID of the user sending the print job is listed in the user information database D2. The user ID "Taro" is listed in the user information database D2, and matching is performed. By the matching, the word "Secret" selected on the key select screen 183 is compared with the printing contents of the print job. Whether the word "Secret" is included in the printing contents is checked. The word "Secret" is included in the printing contents of the print job, and the print job is stored as a private print job in a private print job queue.

The print job is stored as a private print job, and the print job is executed and printing is performed when the user of PC 3 goes to the MFP 1 and performs a predetermined operation on the operation unit 17.

When the printing contents of the received print job include the key selected on the key select screen 183, the MFP 1 in the first embodiment automatically stores the print job as a private print job. Thus, as long as the key is included in a confidential document, accidental ordinary printing by the user's mistake can be prevented. Namely, the MFP 1 can prevent that the contents of a confidential document are seen by a third party.

Further, the MFP 1 judges whether to perform a private print or ordinary print. This decreases the processing load of a PC to send a print job.

Second Embodiment

A second embodiment will be explained. The same reference numerals are given to components the same as those of the first embodiment, and detailed explanation will be omitted. In the second embodiment, a PC judges whether a key indicating a confidential document is included in the printing contents. The configuration of PC 3 will be explained. The configurations of PC 4 and PC 5 are the same as the PC 3, and explanation will be omitted.

Figure 12:
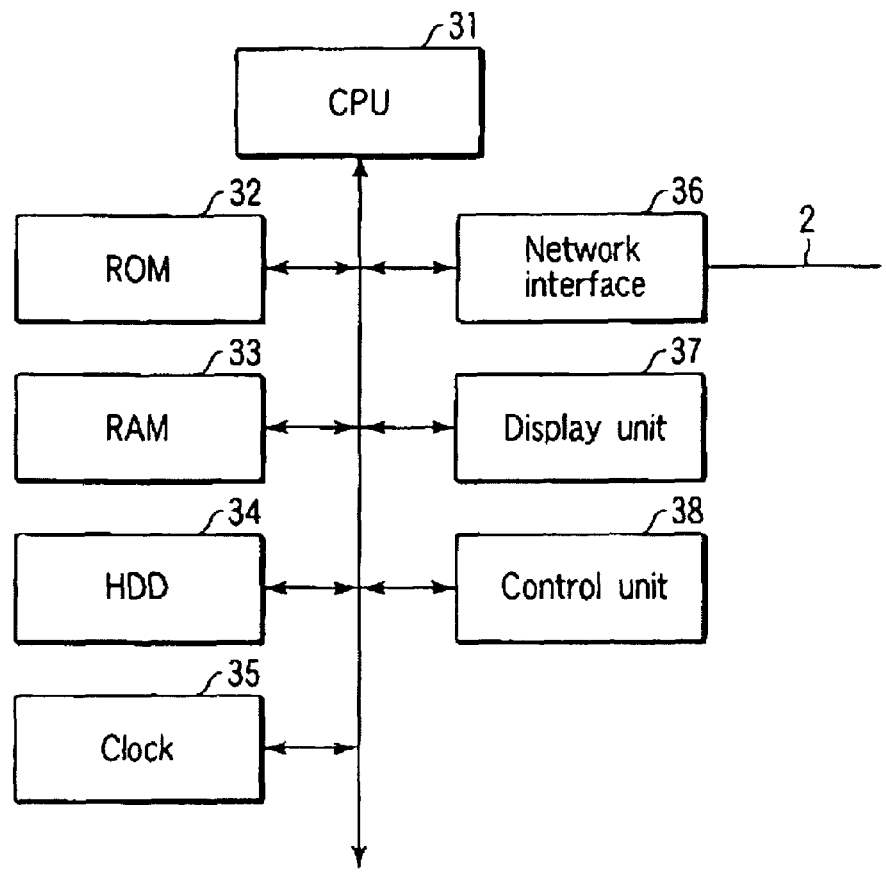
FIG. 12 is a block diagram of essential components of PC in a second embodiment.

FIG. 12 is a block diagram of essential components of the PC 3. As shown in FIG. 12, the PC 3 has a CPU 31, a ROM 32, a RAM 33, a hard disk drive (HDD) 34, a clock 35, a network interface 36, a display unit 37, and a control unit 38. The CPU 31 is connected to the ROM 32, RAM 33, HDD 34, clock 35, network interface 36, display unit 37 and control unit 38, through a bus line.

The CPU 31 controls the whole PC 3 by executing a control program stored in the ROM 32. The ROM 32 stores a control program and fixed data executed by the CPU 31. The RAM 33 has a work area required by the CPU 31 to execute the control program, the application software stored in the HDD 34, and the printer driver stored in the ROM 32.

The hard disk drive 34 stores various application software and a printer driver to send a print job to the MFP 1. The clock 35 counts date and time. The network interface 36 is connected to the network 2 for performing data communication with the MFP 1, for example, connected to the network 2. The display unit 37 is a monitor, for example, and displays the information necessary for the user under the control of CPU 31. The control unit 38 is a keyboard or a mouse, for example, and transmits an instruction from the user to the CPU 31.

Figure 13:
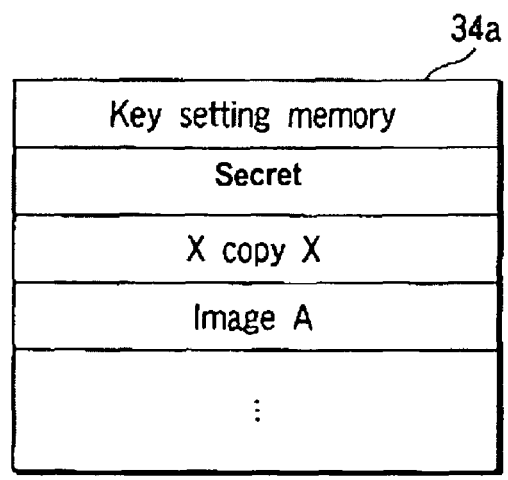
FIG. 13 shows an example of a key setting memory in the same embodiment.

FIG. 13 shows an example of the key setting memory 34*a*. As shown in FIG. 13, the key setting memory 34*a* is the same as the key setting memory 14*a* of the MFP 1 explained in the first embodiment. When a key is changed on the key select screen 183 in the display unit 18 of the MFP 1, the setting of the key setting memory 34*a* (including a not-shown flag) is also changed.

Figure 14:
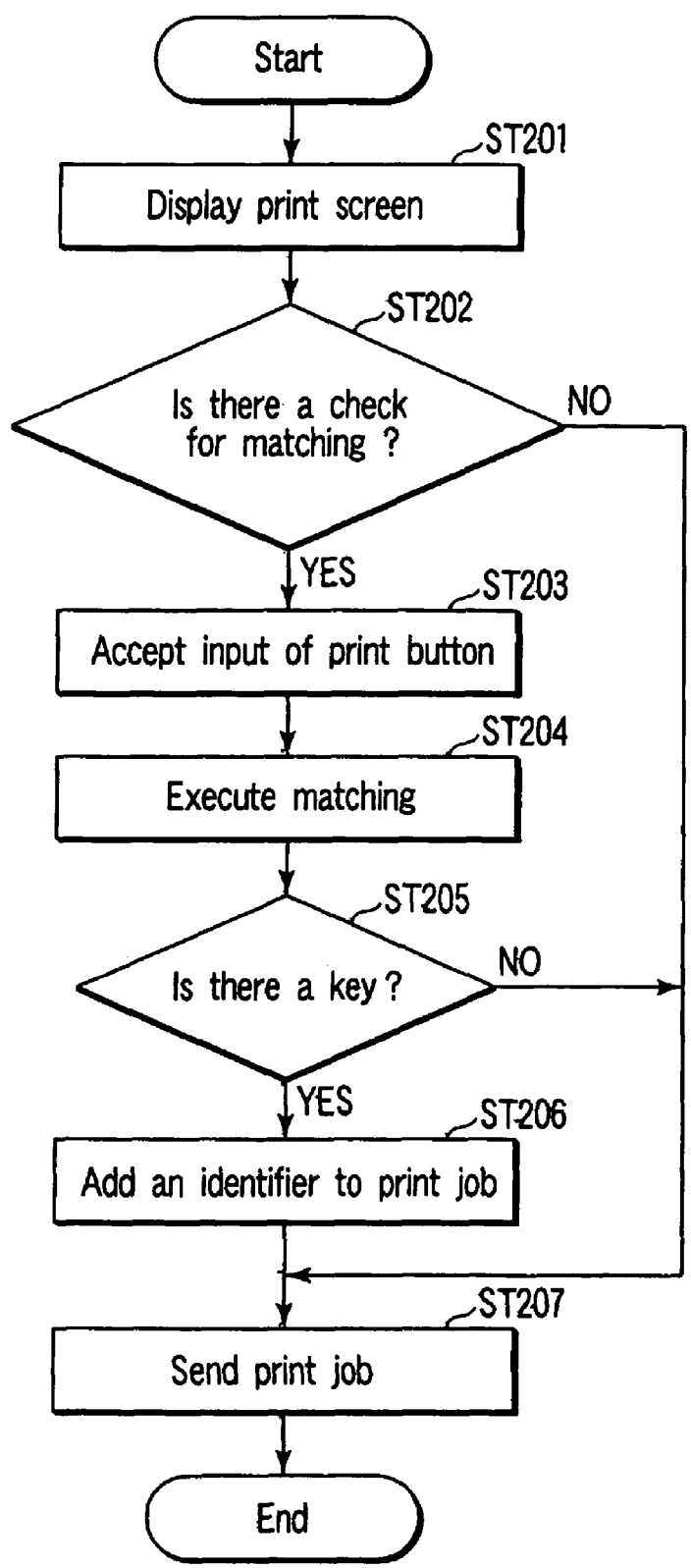
FIG. 14 is a flowchart of the processing executed by CPU when sending a created print job to MFP in the same embodiment.

Next, explanation will be given on the process of sending a print job from the PC 3 configured as above to the MFP 1. FIG. 14 is a flowchart of the processing executed by the CPU 31 when creating a print job to print a document created by a given application and sending the print job to the MFP 1.

First, the CPU 31 displays a print screen in the display unit (ST 201). The print screen is used for setting the printer driver, for example. The print screen displays a checkbox (not shown) to check whether to perform matching of the selected key with the printing contents. The CPU 31 judges whether the checkbox is marked with a checkmark (ST 202).

When the CPU 31 judges that the checkbox is marked with a checkmark (YES in ST 202), the CPU 31 accepts the input of the print button (ST 203). The CPU 31 executes the matching (ST 204), and judges whether the key is included (ST 205). The matching and judgment whether the key is included are the same as steps ST 105 and ST 106 explained with reference to FIG. 11, and explanation will be omitted.

When the CPU 31 judges that the key is included in the printing contents (YES in ST 205), the CPU 31 performs the processing for adding an identifier to the print job (ST 206). The identifier makes the item "Private print" of the print job database D1 "YES". This identifier is added to the header of a print job for example.

When the CPU 31 performs the processing for adding an identifier (ST 206), judges that the checkbox for matching is not marked with a checkmark (NO in ST 202), or judges that the printing contents does not include a key (NO in ST 205), the CPU 31 creates a print job and sends the created print job (ST 207).

The print job sent from the PC 3 to the MFP 1 includes the data/time to send, user ID, identifier and data body or the printing contents. The identifier is written "YES" when the printing contents include a key, and written "NO" when the printing contents do not include a key.

Figure 15:
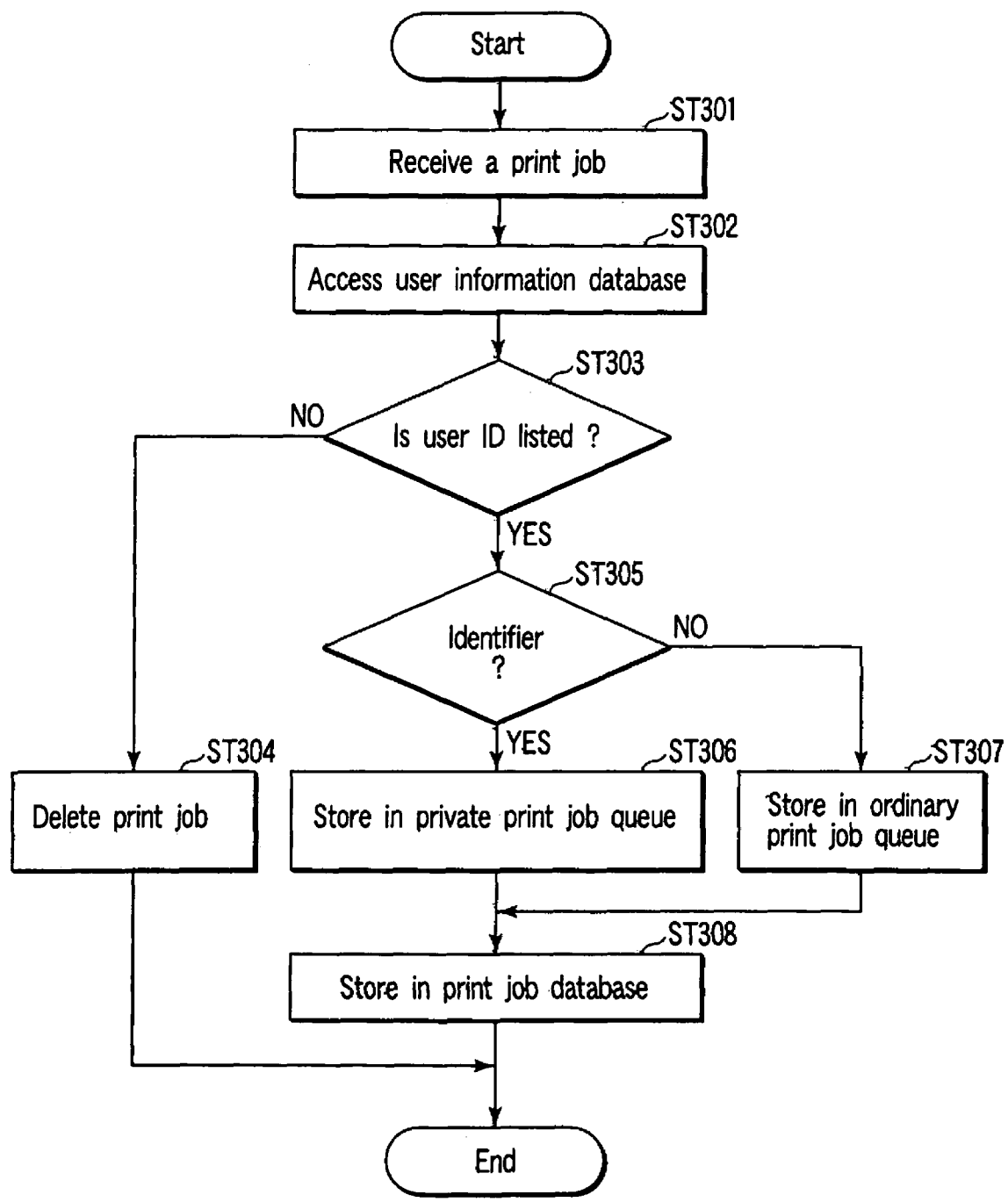
FIG. 15 is a flowchart of the processing executed by CPU in the same embodiment, when a print job is received.

Next, explanation will be given on the processing of the MFP 1 when a print job is sent from the PC 3 to the MFP 1. FIG. 15 is a flowchart of the processing executed by the CPU 11 when a print job including the description (identifier) of the private print item is received.

The processing of steps ST 301 to ST 304 executed by the CPU 1 is the same as the processing of steps ST 101 to ST 104 explained in the first embodiment, and explanation will be omitted. Explanation will be given on the processing after the case that the user ID written in a print job has been listed in the user information database D2 (YES in ST 304).

The CPU 11 checks how is the identifier of the print job (ST 305). When the CPU 11 judges that the identifier is "YES" (YES in ST 305), the CPU 11 stores the received print job in the private print job queue (ST 306). When the CPU 11 judges that the identifier is "NO" (NO in ST 305), the CPU 11 stores the received print job in the ordinary print job queue (ST 307).

After storing the print job in the private print job queue or ordinary print job queue, the CPU 11 stores the print job in the job database D1 (ST 308).

In this time, when the print job is stored in the private print job queue, "YES" is stored in the "Private print" area of the print job database D1, and when the print job is stored in the ordinary print job queue, "NO" is stored.

Next, explanation will be given on the operations in the PC 3 and MFP 1 configured as described above when the PC 3 creates a print job to print the document 23 shown in FIG. 10, and sends the print job to the MFP 1. The user ID of the PC 3 is "Taro", and listed in the user information database D2.

The user operates the operation unit 38 of the PC 3, and creates the document 23 shown in FIG. 10 on a given application. The user displays the print screen in the display unit 37. On the print screen, the checkbox for the above-mentioned matching is marked with a checkmark. When the user presses the print button in this state, the word "Secret" selected on the key select screen 183 is compared with the printing contents of the document 23 by the matching operation. Whether the word "Secret" is included in the printing contents is checked. The printing contents of the document 23 include the word "Secret", and the identifier "YES" is written in the header of the print job. The print job is sent from the PC 3 to the MFP 1.

Receiving the print job, the MFP 1 checks whether the user ID of the user sending the print job is listed in the user information database D2. The user ID "Taro" has been listed in the user information database D2. Thus, how is the identifier of the print job is checked. The identifier "YES" is added to the print job, and the print job is stored as a private print job in a private print job queue.

The print job is stored as a private print job, and the print job is executed and printing is performed when the user of PC 3 goes to the MFP 1 and performs a predetermined operation on the operation unit 17.

When the printing contents include the key selected on the key select screen 183, the PC 3 sends the print job with the identifier "YES" to the MFP 1.

Receiving the print job with the identifier "YES", the MFP 1 automatically stores it as a private print job.

Thus, as long as the key is included in a confidential document, accidental ordinary printing by the user's mistake can be prevented. Namely, the MFP 1 can prevent that the contents of a confidential document are seen by a third party.

Further, the PC 3 judges whether to perform private print or ordinary print, before sending a print job to the MFP 1. This decreases the processing load on the MFP 1 to receive a print job.

Third Embodiment

A third embodiment will now be explained. The same reference numerals are given to the same components in the second embodiment, and detailed explanation will be omitted. In the third embodiment, a private print time is provided to handle all print jobs as a private print job.

The private print time can be set and changed by pressing the button 182*b* on the change item select screen 182 explained with reference to FIG. 7. When the button 182*b* is pressed, a private print time setting screen 37*a* is displayed. In the third embodiment, explanation will be given on a case that the private print time setting screen 371 is displayed in the display unit 37. It is of course possible to display it in the display unit 18 of the MFP 1.

Figure 16:
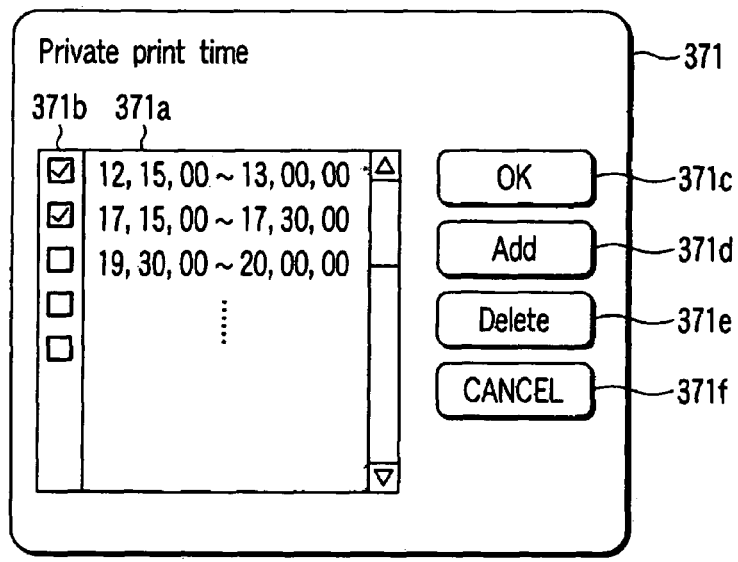
FIG. 16 shows an example of a private print time setting screen in a third embodiment.

FIG. 16 shows an example of the private print time setting screen 371. The private print time setting screen 371 has a set time 371*a*, a checkbox 371*b*, an OK button 371*c*, an add button 371*d*, a delete button 371*e* and a CANCEL button 371*f*. The time zone marked in the checkbox 371*b* is set as private print time. The user can change the private print time setting by using the OK button 371*c*, add button 371*d*, delete button 371*e* and CANCEL button 371*f*. When the add button 371*d* is pressed, a time zone setting screen 372 is displayed.

Figure 17:
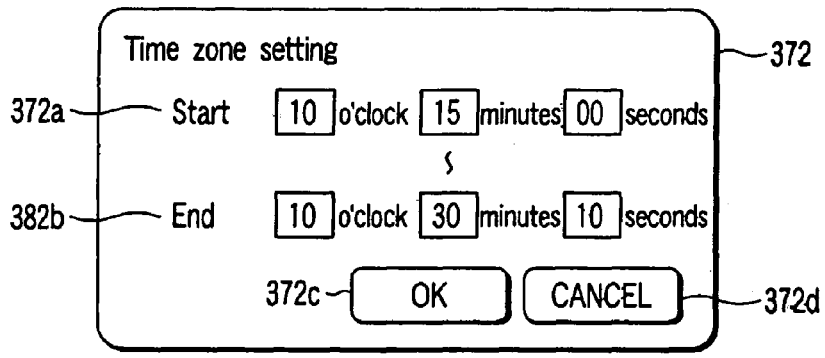
FIG. 17 shows an example of a time zone setting screen in the same embodiment.

FIG. 17 shows an example of the time zone setting screen 372. The time zone setting screen 372 has an area 372*a* to set the beginning of set time, an area 372*b* to set the end of set time, an OK button 372*c* and a CANCEL button 372*d*. After setting the time and pressing the OK button 372*c*, mark the checkbox of the corresponding time zone on the private print time setting screen 371. The private print time is set by this.

Figure 18:
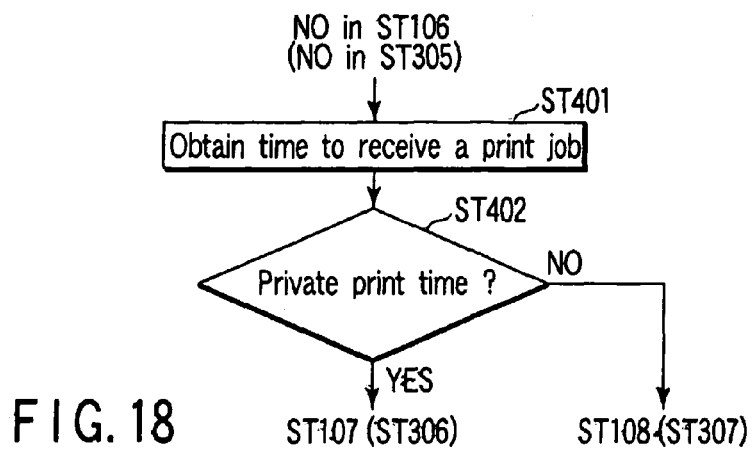
FIG. 18 is a flowchart of the processing executed by CPU in the same embodiment, when a print job is received.

Next, explanation will be given on the processing executed when the MFP receives a print job in a case that the private print time is set as described above. FIG. 18 is a flowchart of the processing executed by the CPU 11 when a print job is received. This processing is executed between the case that a key is judged not included in the first embodiment (NO in ST 106) and the case that a print job is stored in an ordinary print queue (ST 108). In the second embodiment, this processing is executed between the case that an identifier is judged "NO" (NO in ST 305) and the case that a print job is stored in an ordinary print queue (ST 307). Therefore, the other parts have been explained in the first and second embodiments, and explanation will be omitted in the third embodiment.

When the CPU 11 judges that a key is not included (NO in ST 106 or ST 305), the CPU 11 obtains the time to receive the print job from the clock 22 (ST 401). The CPU 11 judges whether it is private print time or not (ST 402). Namely, the CPU 11 judges whether the time obtained from the clock 22 is the private print time set on the private print time setting screen 371.

When the CPU 11 judges that the time is private print time (YES in ST 402), the CPU 11 stores the print job in a private print job queue (ST 107 or ST 306). When the CPU 11 judges that the time is not private print time (NO in ST 402), the CPU 11 stores the received print job in an ordinary print job queue (ST 108 or ST 307).

In the third embodiment, when the MFP 1 receives a print job while private print time is being set, the print job is automatically stored as a private print job even if a key is not included in the printing contents of that print job. Thus, for example, by setting private print time previously for the time zone with many people, a print job is automatically listed as a private print job in during time zone with many people. This decreases the possibility that a confidential document is seen by a third party.

Further, it is possible to change a print job to private print or ordinary print according to whether the time zone is with many people or a few people.

In the explanation of the first and second embodiments, a print job is deleted when the user ID is not listed in the user information database D2. However, it is permitted to store a print job in a private print job queue or an ordinary print job queue even if the user ID is not listed in the user information database D2.

In the first to third embodiments, when a print job stored as a private print is not printed after a certain time, that job may be deleted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the invention as defined by the appended claims and equivalents thereof.

What is claimed is:

1. An image forming apparatus comprising:
    a receiving unit configured to receive a print job through a network;
    an ordinaryprint job queue configured to store a print job for conducting ordinary printing;
    a private print job queue configured to store a print job for conducting private printing;
    a key setting memory configured to store a key which is stored to determine whether the print job is a private printing or an ordinary printing;
    a comparator configured to compare the printing contents of the print job received by the receiving unit with the key stored in the key setting memory;
    a key judgment unit configured to judge whether an identical part is included in the key and the printing contents;
    a clock configured to count date and time;
    a time setting unit configured to set the time zone for private printing;
    an obtaining unit configured to obtain the time to receive the print job from the clock if the receiving unit receives a print job;
    a time judgment unit configured to judge whether the time obtained from the obtain unit is included in a time zone set by the time setting unit; and
    a processing unit configured to:
        store the received print job in the private print job queue if the key judgment unit judges that the identical part is included,
        store the received print job in the private print job queue if the key judgment unit judges that the identical part is not included and the time judgment unit judges that the obtained time is included in the set time zone, and
        store the received print job in the ordinary print job queue if the key judgment unit judges that the identical part is not included and the time judgment unit judges that the obtained time is not included in the set time zone.

2. The image forming apparatus according to claim 1, wherein the time setting unit sets a time zone for private printing as private print time through a setting screen, and wherein the private print time is specified with a start time and an end time.

3. The image forming apparatus according to claim 2, wherein the private print time is a time zone in which many people use the image forming apparatus.

4. The image forming apparatus according to claim 1, wherein the key stored in the key setting unit is one of a specific character string, a symbol, or an image.

5. The image forming apparatus according to claim 2, further comprising a change item select screen display configured to display a change item select screen having a first button which specifies private printing or ordinary printing and a second button which specifies setting or change of the private print time.

6. The image forming apparatus according to claim 5, further comprising a key selection screen display configured to display a key selection screen which displays a key stored in the key setting unit if the first button is specified through the change item selection screen.

7. The image forming apparatus according to claim 6, wherein the key selection screen has an add button for additional input of a key.

8. The image forming apparatus according to claim 5, further comprising a private print time setting screen display configured to display a private print time setting screen which displays a time zone set by the time setting unit if the second button is specified through the change item setting screen.

9. The image forming apparatus according to claim 8, wherein the private print time setting screen has an add button for additional input of time zone.

10. An image forming method of an image forming apparatus having an ordinary print job queue configured to store a print job for ordinary printing, a private print job queue configured to store a print job for private printing, and a clock configured to count date and time, the image forming method comprising:
    storing a key for determining if the print job is a private printing or ordinary printing in a key setting memory;
    setting a time zone for private printing by a time setting unit;
    receiving a print job through a network;
    comparing a print matter of a print job received by the receiver and a key stored in the key setting memory by a comparator;
    judging whether an identical part is included in the key and the printing contents, based on the result of the comparison by the comparator;
    obtaining a received time of a print job from the clock when receiving a print job from the receiver;
    judging whether the time obtained from the obtain unit is included in the time zone set by the time setting unit by time judging unit;
    storing a received print job in private print job queue if the key judging unit judges that the identical part is included;
    storing a received print job in private print job queue if the key judging unit judges that the identical part is not included and the time judging unit judges that the obtained time is included in the set time zone; and
    storing a received print job in ordinary print job queue if the key judging unit judges that the identical part is not included and the time judging unit judges that the obtained time is included in the set time zone.

11. The image forming method according to claim 10, wherein the time setting unit sets a time zone for private printing as a private print time through a setting screen, and wherein the private print time is specified with a start time and an end time.

12. The image forming method according to claim 11, wherein the private print time is a time zone in which many people use the image forming apparatus.

13. The image forming method according to claim 10, wherein the key stored in the key storing memory is one of a specific character string, a symbol, or an image.

14. The image forming method according to claim 11, wherein a change, item setting screen has a first button which specifies private printing or ordinary printing, and a second button which specifies setting or change of the private print time is displayed.

15. The image forming method according to claim 14, wherein a key selection screen displays a key stored in the key setting memory if a first button is specified through the change item setting screen.

16. The image forming method according to claim 15, wherein the key selection screen has an add button for additional input of the key.

17. The image forming method according to claim 14, wherein a private print time setting screen displays a time zone set by the time setting unit if the second button is specified through the change item setting screen.

18. The image forming method according to claim 17, wherein the private print time setting screen has an add button for inputting additional time zone.

* * * * *